(12) United States Patent
Avram et al.

(10) Patent No.: US 7,743,373 B2
(45) Date of Patent: Jun. 22, 2010

(54) METHOD AND APPARATUS FOR MANAGING SOFTWARE CATALOG AND PROVIDING CONFIGURATION FOR INSTALLATION

(75) Inventors: Mircea Avram, Toronto (CA); Peter Kissa, Woodbridge (CA); Geyu Li, Scarborough (CA); Radu Bogdan Mateescu, Toronto (CA); Arnaud Airy Xavier Lucien Mathieu, Austin, TX (US); Andrei Oprea, Ajax (CA); C. Razvan Peteanu, North York (CA); John Conrad Sanchez, Pflugerville, TX (US); Cristina L. Tecsa, Richmond Hill (CA); Teodor Laurentiu Tecsa, Richmond Hill (CA); Andrew Neil Trossman, North York (CA)

(73) Assignee: International Business Machines Corporation, Armonk, NY (US)

( * ) Notice: Subject to any disclaimer, the term of this patent is extended or adjusted under 35 U.S.C. 154(b) by 1433 days.

(21) Appl. No.: 11/123,304

(22) Filed: May 6, 2005

(65) Prior Publication Data

US 2006/0253849 A1    Nov. 9, 2006

(51) Int. Cl.
  *G06F 9/445* (2006.01)
  *G06F 9/44* (2006.01)
(52) U.S. Cl. .................. 717/174; 717/173; 717/175
(58) Field of Classification Search .......... 717/170–177
  See application file for complete search history.

(56) References Cited

U.S. PATENT DOCUMENTS 6,272,674 B1 * 8/2001 Holiday, Jr. .................. 717/174
6,564,377 B1 * 5/2003 Jayasimha et al. .......... 717/174
6,678,888 B1 * 1/2004 Sakanishi .................... 717/172
6,681,323 B1 * 1/2004 Fontanesi et al. ............... 713/1
6,862,581 B1 * 3/2005 Lambiase ..................... 705/51
6,957,422 B2 * 10/2005 Hunt ........................... 717/130
6,964,034 B1 * 11/2005 Snow .......................... 717/121
6,999,956 B2 * 2/2006 Mullins ........................ 707/2
7,149,734 B2 * 12/2006 Carlson et al. ................. 707/6
7,191,429 B2 * 3/2007 Brassard et al. ............. 717/104
7,318,216 B2 * 1/2008 Diab ........................... 717/108
7,376,945 B1 * 5/2008 Kakumani et al. .......... 717/171
7,418,700 B2 * 8/2008 Zimniewicz et al. ........ 717/175
7,430,610 B2 * 9/2008 Pace et al. ................... 709/233

(Continued)

OTHER PUBLICATIONS

Xu et al, "Metadata driven memory optimizations in dynamic binary translator", ACM VEE, pp. 148-157, 2007.*

(Continued)

*Primary Examiner*—Anil Khatri
(74) *Attorney, Agent, or Firm*—Yee & Associates, P.C.; Jeffrey S. LaBaw

(57) ABSTRACT

A method and apparatus enhancing software catalog manageability, providing abstract software configuration, and desired state management. A first mechanism enhances software catalog manageability. The first mechanism includes a software model that separates metadata of software from actual binaries of the software. A second mechanism abstracts software configuration for automation. The second mechanism includes a hierarchical software resource template structure that specifies parameters, dependencies between parameters, features, options, and parameters that cannot be predefined. A third mechanism provides for desired state management and patch compliance assessments. The third mechanism checks against a server template or software resource in a data center model against what is installed on actual machines to determine compliance.

21 Claims, 6 Drawing Sheets

U.S. PATENT DOCUMENTS

| | | | | |
|---|---|---|---|---|
| 7,496,910 B2 * | 2/2009 | Voskuil | .................... | 717/168 |
| 7,505,995 B2 * | 3/2009 | Grealish et al. | ......... | 707/103 R |
| 7,536,686 B2 * | 5/2009 | Tan et al. | .................... | 717/174 |
| 7,546,594 B2 * | 6/2009 | McGuire et al. | ............ | 717/168 |
| 7,568,195 B2 * | 7/2009 | Markley et al. | ............. | 717/175 |
| 7,634,770 B2 * | 12/2009 | Roth | .......................... | 717/170 |
| 7,634,771 B2 * | 12/2009 | Benjes et al. | ............... | 717/174 |
| 2002/0112232 A1 | 8/2002 | Ream et al. | ................ | 717/176 |
| 2005/0050315 A1 | 3/2005 | Burkhardt et al. | ........... | 713/150 |

OTHER PUBLICATIONS

Wang et al, "Jato: A compact binary file format in Java class", IEEE, pp. 467-474, 2001.*

Junkai et al, "An approach for sensitive file protection", IEEE, pp. 716-718, 2009.*

Yardimci et al, "Mostly static program partitioning of binary executables", ACM Trans. on Prog. Lang. and System, vol. 31, No. 5, article 17, pp. 1-46, 2009.*

* cited by examiner

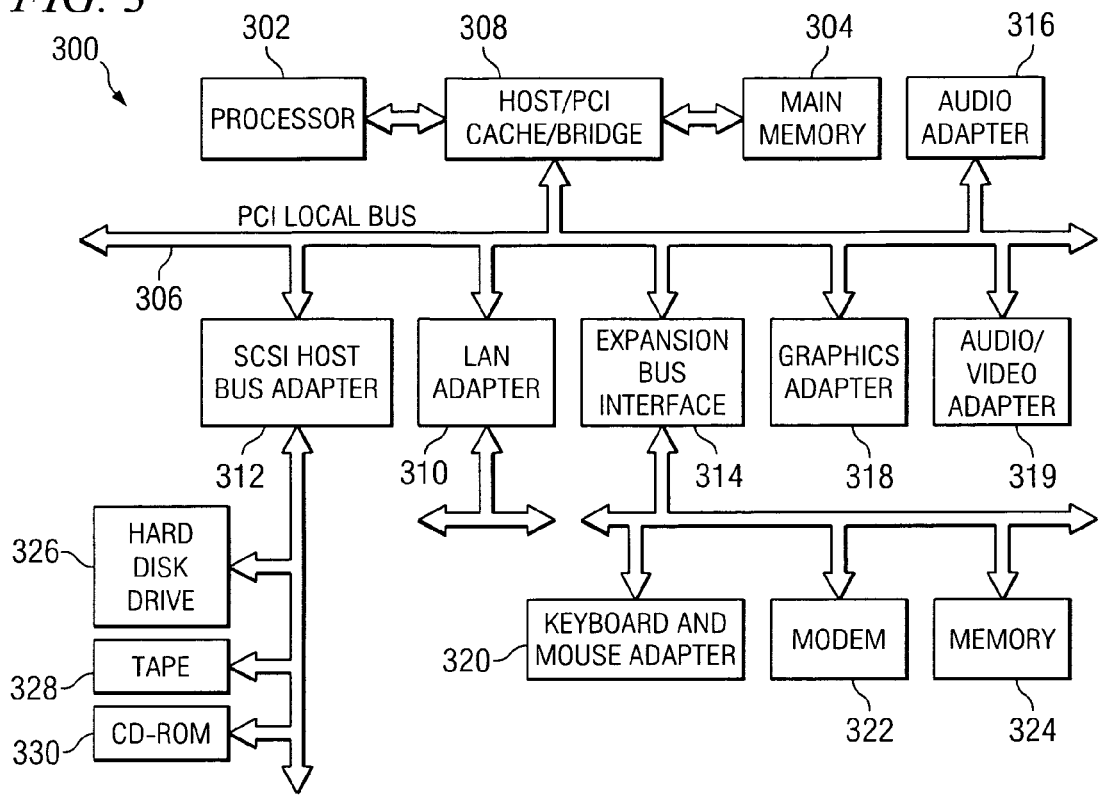
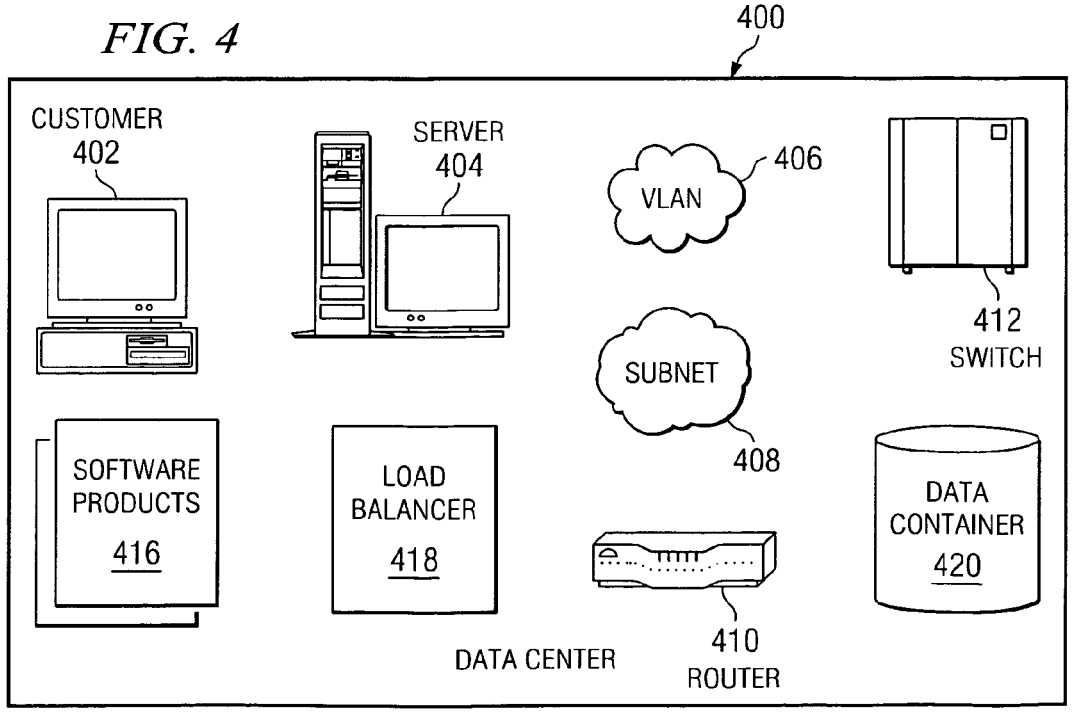

FIG. 6A

```xml
<software-module name="DB2 For Linux" is-device-model="Simulator" version="1.0" >
         602

<software-module name="WebSphere" version="5.0" >
    <software-capability name="servlet.version" value="2.3"/>
    <software-capability name="ejb.version" value="1.1"/>
    <software-capability name="jdk.version" value="1.4"/>
    <supported-requirement-type value="JRE"/>
    <supported-requirement-type value="EJB_CONTAINER"/>
    <supported-requirement-type value="SERVLET_ENGINE"/>
    <installable-package name="WAS" version="1.0" file-repository="test file repository" status="not_tested
        <file name="wasSetup.exe" path="package-path"/>
    </installable-package>
```

TO FIG. 6B

```xml
<software-resource-template name="WAS-Standard" software-resource-device-model="Simulator" software-resource-type="INSTALLATION">
    <template-param name="wasBean.installLocation" value="C:\webSphere51\AppServer"/>
    <software-resource-template name="IBM HTTP server" software-resource-device-model="Simulator">
        <template-param name="ihsFeatureBean.installLocation" value="C:\IBMHTTPServer"/>
    </software-resource-template>
    <software-resource-template name="Server" software-resource-type="FEATURE" is-selected="true">
        <template-param name="serverBean.active" value="true" is-changeable="true"/>
    </software-resource-template>
    <software-resource-template name="Assembly and Deployment Tools" software-resource-type="FEATURE">
        <template-param name="applicationAndAssemblyToolsBean.active" value="true"/>
    </software-resource-template>
    <software-resource-template name="Embedded Messaging" software-resource-type="FEATURE">
        <template-param name="mqSeriesBean.active" value="true"/>
        <software-resource-template name="Messaging Client and Server" software-resource-type="INSTALLATION">
            <template-param name="mqSeriesServerBean.active" value="true"/>
            <template-param name="mqSeriesServerBean.installLocation" value="C:\Program Files\IBM\WebSphere MQ"/>
        </software-resource-template>
        <software-resource-template name="Messaging Client Only" software-resource-type="INSTALLATION">
            <template-param name="mqSeriesClientBean.active" value="true"/>
            <template-param name="mqSeriesClientBean.installLocation" value="C:\Program Files\IBM\WebSphere MQ"/>
        </software-resource-template>
    </software-resource-template>
</software-resource-template>
</software-module>
```

FIG. 6B

METHOD AND APPARATUS FOR MANAGING SOFTWARE CATALOG AND PROVIDING CONFIGURATION FOR INSTALLATION

BACKGROUND OF THE INVENTION

1. Technical Field

The present invention relates to a data processing system. In particular, the present invention relates to enhancing software catalog manageability for provisioning applications. Still more particularly, the present invention relates to enhancing manageability of a software catalog, abstracting software configuration, and desired state management.

2. Description of Related Art

Currently, data center administrators have to organize, install, and configure a large number of software products in a data center. These software products have different variations, for example, different locale, different operating system specificity, etc. Some of the variations may or may not be relevant. The relevancy is often handled at the time of installation by administrators. In addition, there may be common attributes across these software products that are replicated for each application definition.

Since the configurations of these software products are complex, it is difficult to achieve a desired outcome of an installation with the proper configuration without post-installation adjustments. The more complex a software product is, the harder it is to coherently specify all configuration parameters for the required elements to be created at installation time.

To alleviate the complexity of software products, response files are used. A response file comprises responses of an installation much like a wizard used during installation, except that the response file is predefined by an administrator with configuration settings of the software product. Thus, a response file comprises a list of name-value pairs that are predefined before installation. While the response file is useful in automatic deployment of software, it is limiting in that the response file is textual and it lacks the flexibility for change. In addition, the response file fails to capture everything a software product needs during post installation configuration.

Furthermore, the response file fails to handle dependencies between configuration settings. For example, a J2EE Web module running on a Web server on machine X may depend on a database module running on a database server on machine Y. Currently, the user has to define the IP address of the database server in which the database module resides at installation time in order to invoke the module.

For complex software, such as, for example, DB2®, multiple instances may need to be created with one instance as a default installation. Each instance running on the same machine may have its own configuration parameters. With response files, these configuration parameters are specified after the software is installed. Post-installation adjustments are time consuming and error prone. Thus, with the above limitations, an automated solution without the use of response files is desired.

Once the software products are installed, the state of a machine is mostly monitored using a manual inventory process. This manual process requires significant time and effort by the Administrators. A need exists for a mechanism that automatically accesses the state of a machine and determines compliance of the machine's current state with a desired state. In addition, in cases of non-compliance, a need exists for a mechanism that automatically applies approved patches to the machine.

Therefore, it would be advantageous to have a mechanism that eases catalog management and provides a flexible mechanism that abstracts software configurations for automation. Furthermore, it would be advantageous to have a mechanism that automatically manages compliance of machines to a desired state.

SUMMARY OF THE INVENTION

Embodiments of the present invention provide a first mechanism for enhancing software catalog manageability. The first mechanism includes a software model that separates metadata of software from actual binaries of the software. In addition, embodiments of the present invention provide a second mechanism for abstracting configuration and settings of the software using a hierarchical software resource template. Furthermore, embodiments of the present invention provide a third mechanism for comparing software resources or patches installed on a target system with software resources defined in a server template or patches that should be applied to determine a difference and presenting the difference to a user.

BRIEF DESCRIPTION OF THE DRAWINGS

The novel features believed characteristic of embodiments of the invention are set forth in the appended claims. The embodiments of the invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a data processing system in which an illustrative embodiment of the present invention may be implemented;

FIG. 4 is a diagram illustrating an exemplary data center, in accordance with an illustrative embodiment of the present invention;

FIG. 6A is a diagram illustrating an exemplary software resource template in accordance with an illustrative embodiment of the present invention;

FIG. 6B is a diagram illustrating an exemplary software resource template in continuation of FIG. 6A in accordance with an illustrative embodiment of the present invention;

DETAILED DESCRIPTION

Figure 1:
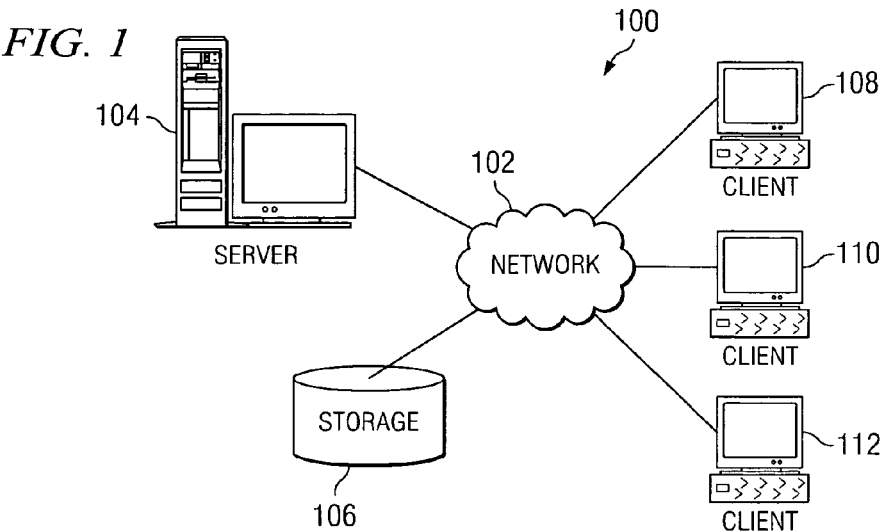
FIG. 1 depicts a pictorial representation of a network of data processing systems in which embodiments of the present invention may be implemented.

With reference now to the figures, FIG. 1 depicts a pictorial representation of a network of data processing systems in which embodiments of the present invention may be implemented. Network data processing system 100 is a network of computers in which the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. Clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
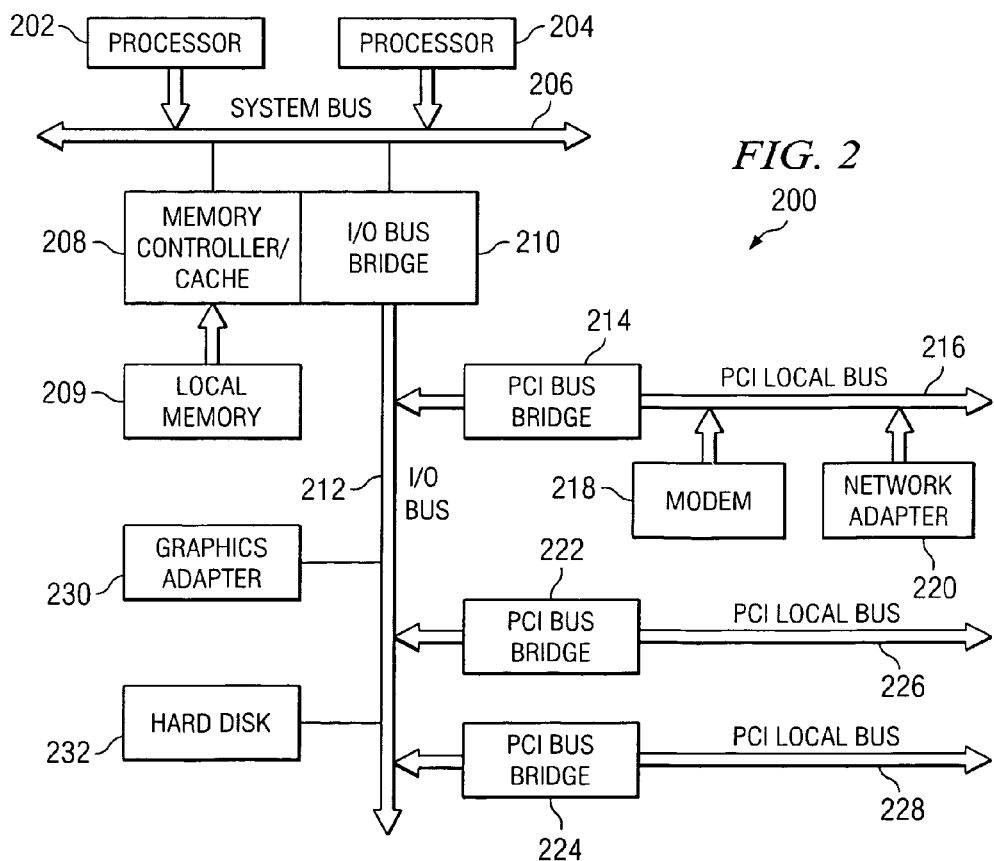
FIG. 2 is a block diagram of a data processing system that may be implemented as a server, in accordance with an embodiment of the present invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. Memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries® system, a product of International Business Machines Corporation in Armonk, N.Y., running the Advanced Interactive Executive (AIX) operating system or the LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for keyboard and mouse adapter 320, modem 322, and memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows® XP, which is available from Microsoft Corporation. An object-oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent non-volatile memory, or optical disk drives and the like, may be used in addition to or in place of the hardware depicted in FIG. 3. Also, the processes of embodiments of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand-held computer in addition to taking the form of a PDA. Data processing system 300 also may be a kiosk or a Web appliance.

Embodiments of the present invention provide a first mechanism for enhancing software catalog manageability. The first mechanism includes a software model that separates metadata of a definition of software from binaries of the software. In addition, embodiments of the present invention provide a second mechanism for abstracting configuration and settings of the software using a hierarchical software resource template. Furthermore, the present invention provides a third mechanism for comparing software resources or patches installed on a target system with software resources defined in a server template or patches that should be applied to determine a difference and presenting the difference to a user.

Turning now to FIG. 4, a diagram illustrating an exemplary data center is depicted, in accordance with an illustrative embodiment of the present invention. As shown in FIG. 4, in this illustrative example, data center 400 includes resources, such as, customer 402, server 404, Virtual Local Area Network (VLAN) 406, subnet 408, router 410, switch 412, software products 416, load balancer 418, and data container 420.

Customer 402 may be, for example, a client or an administrator who uses a data processing system, such as data processing system 300 in FIG. 3. Server 404 may be implemented as a data processing system, such as data processing system 200 in FIG. 2. Server 404 may also be implemented as an application server, which hosts Web services, or other types of servers. Router 410 and switch 412 facilitate communications between different devices. VLAN 406 is a network of computers that behave as if they are connected to the same wire even though they may actually be physically located on different segments of a local area network. Subnet 408 is a portion of a network, which may be a physically independent network segment and shares a network address with other portions of the network.

Software products 416 are applications that may be deployed to a client or a server. Load balancer 418 spreads traffic among multiple systems such that no single system is overwhelmed. Load balancer 418 is normally implemented as software running on a data processing system. Data container 420 may be a database, such as DB2® Universal Database, a product available from International Business Machines Corporation.

Data center 400, as depicted in FIG. 4, is presented for purposes of illustrating an embodiment of the present invention. Other resources, such as, for example, a cluster of servers and switch ports, may also be included in data center 400. The mechanism of an embodiment of the present invention enhances manageability of software catalog that comprises software products, such as software products 416. In addition, the mechanism of an embodiment of the present invention abstracts configuration settings of these software products. Furthermore, the mechanism of an embodiment of the present invention provides management of desired state of machines, including, but limited to servers, such as server 404, and clusters.

The processes of embodiments of the present invention may be performed by processor 302 using computer implemented instructions, which may be located in a memory such as, for example, main memory 304, memory 324, or in one or more peripheral devices 326 and 330.

In an illustrative embodiment, the present invention enhances manageability of a software catalog by providing a first mechanism that decouples information about the software from the binaries. The information about software is known as metadata. The metadata describes what functions the software performs and what attributes are used to install the software. In these examples, the binaries are actual software modules that are installed.

By separating definition of function prerequisites from the installation prerequisites, different degrees of specificity may be defined at different levels. For example, a specific metadata may be defined for the software while relaxing the installation requirements. This makes the software conform to strict metadata. Conversely, the metadata of the software may be generic while installation level details are more specific to a locale. In this way, separation of concerns may be achieved when populating the software catalog with different software products.

Figure 5:
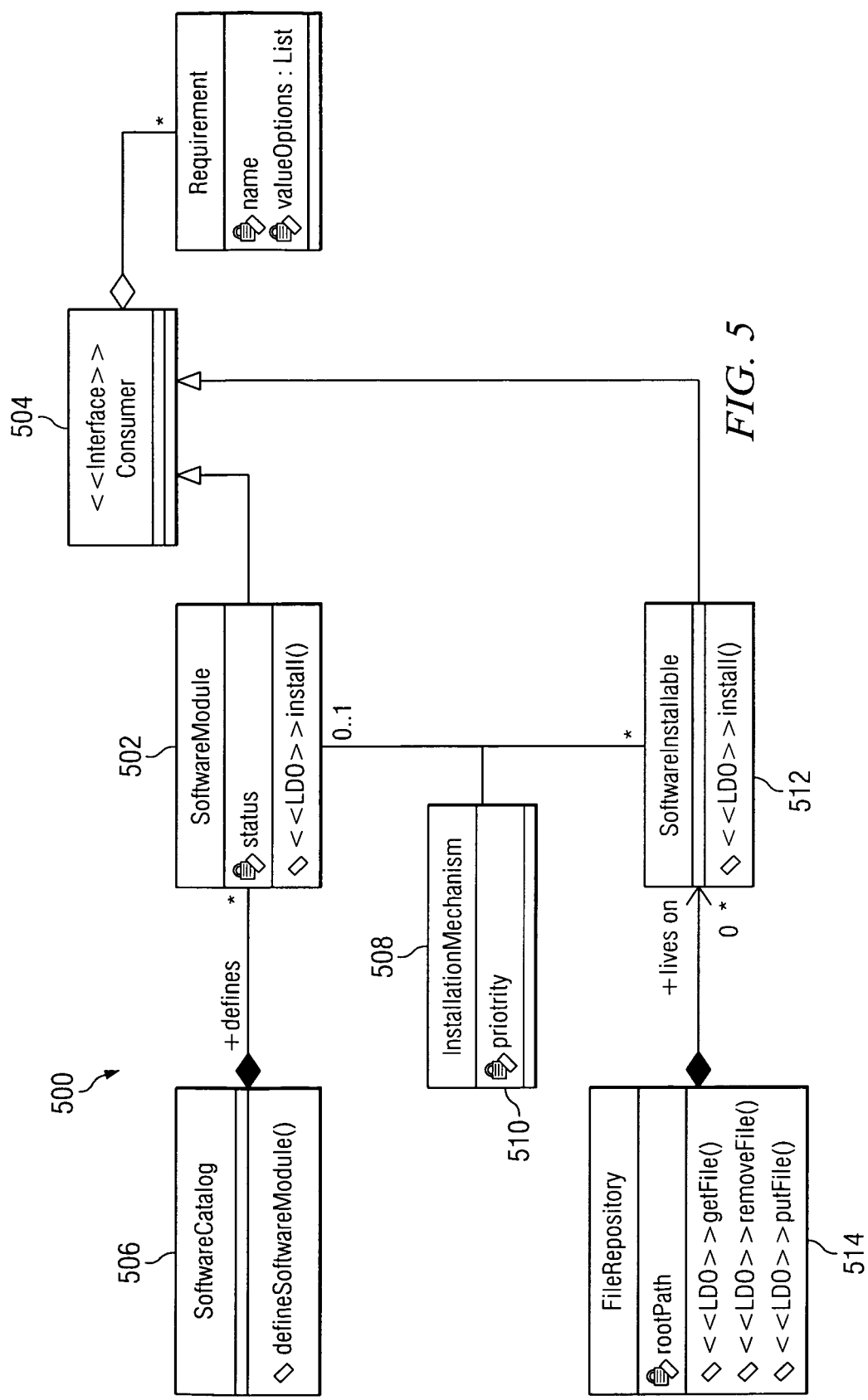
FIG. 5 is a diagram illustrating an exemplary software model used to separate metadata from the binaries in accordance with an illustrative embodiment of the present invention.

Turning now to FIG. 5, a diagram illustrating an exemplary software model used to separate metadata from the binaries is depicted in accordance with an illustrative embodiment of the present invention. As shown in FIG. 5, in example software model 500, software catalog 506 comprises a number of software modules 502 that represent definitions of software.

Software module 502 captures relevant metadata, including prerequisites expressed through requirements, and exposed functionality expressed through capabilities. Software module 502 also is a placeholder for multiple abstract configuration structures that can be used at installation or configuration time. Usually, the metadata of software module 502 is predefined by a designer who created the software. Software module 502 is accessible to consumer 504 via software catalog 506.

At installation time, multiple installation mechanisms 508 may be used to install software module 502. Based on priority 510, each installation mechanism 508 finds a best matched binary, known as software installable 512, for installation on a target machine. Software installable 512 defines a specific version of binaries for installation. The process of finding a best matched binary is as follows:

When installing a software product defined in software catalog 506, the user selects the target machines and configuration structures to be used for installation. The data center automation system then validates the installation requirements as defined in metadata of software module 502 and determines whether software module 502 can be deployed. For example, a target machine may be able to accommodate only a zip format but not Microsoft Software Installer (MSI) format. The data center automation system checks the target machine against the metadata to determine if the target machine can satisfy the requirement, in this case, a software module that is in a zip format.

If the target machine is able to satisfy the requirement, the data center automation system identifies best matched software installable 512 or binaries for carrying out the installation. The system identifies a best matched software installable by traversing the installation packages based on priority 510. The installation packages may reside in file repository 514. If the installation prerequisites as defined in metadata of software installable 512 are satisfied by the target machine or if the software is already installed, a match is found. Best matched software installable 512 or binaries is then invoked to carry out the installation. Thus, for the above example, a zipped version of the binaries is used for installation.

By separating metadata of the software definition from the binaries that are used for installing the software, the mechanism of the present invention provides greater flexibility when setting up the software catalog. While the metadata deals with what software can be used, the installation mechanisms and software installables define how the software can be installed. In this way, users may group software elements and installation structures closer to the way software deployment is performed in their environment.

As described above, different degrees of specificity may be defined at different levels of the software. For example, if a generic metadata of software definition is used, the result of the best matched binaries is more or less the same, since software elements inside the binaries are interchangeable. In one example, a generic software definition is defined for an Apache Jakarta project Tomcat software module. The resulting best matched binaries may be one of a zip format, a MSI format, an exe format, and a tar format. While these binaries formats vary, the content of the binaries themselves remains essentially the same.

In another example, if patch binaries are grouped for different operating system platforms and language combinations under the same software definition, the combinations of patch entries in the software catalog may be reduced to a single entry for the patch, which offers multiple installation mechanisms for it. For example, patch entries that are grouped for different OS platforms and languages may include en_US for XP, en_US for Win2K en_US for Windows® 2003, fr_FR for XP, and fr_FR for Win2k. However, with the mechanism of the present invention, a single patch entry may be offered in the software catalog that includes multiple installable mechanisms for each of these combinations, such that when installation time arrives, the appropriate installable mechanism is chosen automatically based on the prerequisites defined at the installable level. Thus, even though the same software definition is defined for different patch binaries, the content of the binaries themselves is different.

In addition to abstracting prerequisites, methods of installation may be abstracted for the same piece of software by offering different installation mechanisms that use different deployment technologies. For example, a software installation may be realized by using a setup.exe installable, a solution install package, or a third party distribution application.

As described above, metadata in software modules includes complex configurations of software that are often represented in response files. Response files, however, are not only limiting in its flexibility for change. Response files also fail to illustrate dependencies between configurations and fail to capture everything the software requires without post-installation adjustments. Therefore, the present invention provides a second mechanism that abstract complex software configuration to a desired resulting structure of a software installation.

In an illustrative embodiment, the second mechanism of the present invention provides a hierarchy of software resources templates, which captures all necessary deployment options and configuration parameters for installation. The hierarchy of software resource templates is later consumed by a user-defined installation or configuration workflow during actual deployment. The hierarchy of the software resource templates deals with the structure of the resulting software resources, and the installation of the software resources, including instances of the software resources.

The software resource templates of the present invention capture settings and parameters necessary to create a software resource. Examples of software resources include a DB2® installation, a DB2® instance, a WebSphere® installation, and a WebSphere instance. DB2 and WebSphere are products that are available from International Business Machines Corporation. In addition to settings and parameters, the software resource templates also specify the type and device model of the resource once it is created, such that the appropriate behavior can be tied to the deployed software in the form of workflow implementations for the predefined logical device operations. Logical device operations are operations that interact directly with data center devices to perform functions.

Turning now to FIG. 6A, a diagram illustrating an exemplary software resource template is depicted in accordance with an illustrative embodiment of the present invention. As shown in FIG. 6A, settings and parameters needed to create WebSphere software module 602 are described in software resource template 600 in FIG. 6B. Turning now to FIG. 6B, a diagram illustrating an exemplary software resource template in continuation of FIG. 6A is depicted in accordance with an illustrative embodiment of the present invention.

As shown in FIG. 6B, within software resource template 600, a number of software resource templates are nested. In this example, IBM HTTP server 606, server 608, assembly and deployment tools 610 and embedded messaging 612 are nested within WAS-Standard 604. Within each software resource template, parameters are defined in the form a name-value pair. For example, for WAS-Standard 604, a parameter with a name of "wasBean.installLocation" 614 and a value of "C:\WebSphere51\AppServer" 616 is defined.

The parameters within each software resource template may be a simple or derived parameter. A simple parameter is a parameter that holds its own value. A derived parameter is a parameter that composes of one or more tokens with at least one token derived from another parameter. The parameter from which the token is derived may be from the same software resource template or another software resource template.

With the derived parameter, no need is present to specify the same value in multiple places, which may be error prone when the value changes. In addition, derived parameters may be used to specify configuration settings for software elements that compose a distributed application. In a distributed application, settings of one module may depend on another. For example, in a Web application, the data source has to be defined for a war module, which depends on the database name, address and port of the database module deployment.

In addition to parameters, software resource template 600 in FIG. 6B may also be used to specify features and options of the software. Features are pieces of functionalities selectable by a user that may be opted out or in when the software is installed. Options are pieces of functionalities mutually exclusive that are selectable by the user. By specifying both features and options of the software, the user is presented with a coherent interface. In the example illustrated in FIG. 6B, a software resource type is defined for server 608 as feature 618. This means that server 608 is presented to the user as a selectable feature.

As shown in FIGS. 6A and 6B, software module WebSphere 602 may have multiple software resource templates. Having multiple software resource templates allows for flexibility when automating deployments, since the same software can be installed or configured in various ways in the data center. For example, a test installation is different from a production installation of the same software. At installation time, the user is presented with the preset alternatives for selection of an installation and the desired underlying structure is offered for refinement.

A series of derived templates may point back to their source. When a user is presented with the template structure and the user makes changes to the template, the mechanism of the present invention creates a clone resource template structure that is not affected by the changes rather than modifying the original values. Thus, the cloning sequence takes care of change versioning. In this way, other users of the same template may not be affected by changes that are made for a single deployment or configuration, which uses the same set of configuration elements. For example, for a DB2 application, if the resource template of one instance of the application is changed, a new instance of the application is added with the customization and passed to the installer, such that the user can configure the new instance of the application before the install.

The software resource templates, such as software resource templates shown in FIGS. 6A and B, are grouped in a hierarchy parallel to the resulting software. In this way, configuration parameter structures may be handled more easily than response files. Thus, the software resource templates serve as blueprints that show how the end result of the software looks like, where the parameters are placed, and what are actually installed in the target machine.

Figure 7:
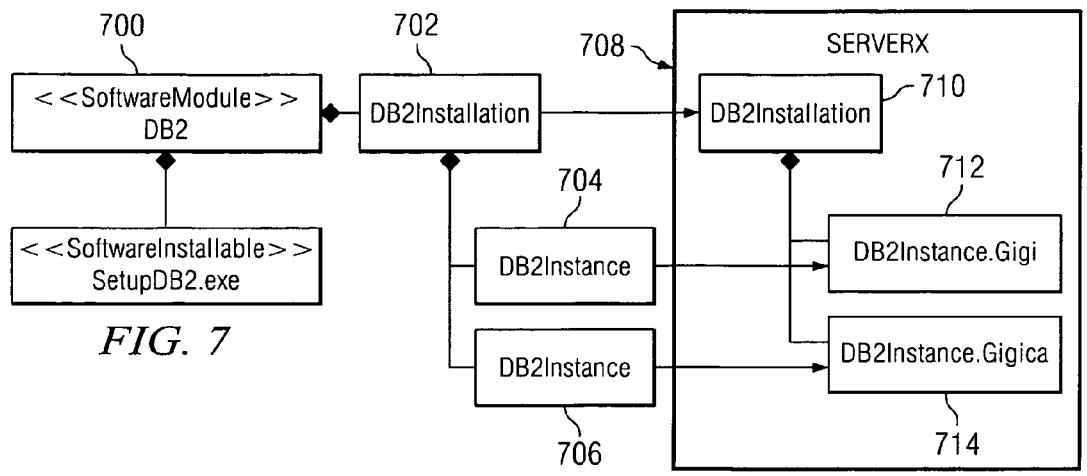
FIG. 7 is a diagram illustrating an exemplary hierarchical structure of a software resource template parallel to the software resource to be created in accordance with an illustrative embodiment of the present invention.

Turning now to FIG. 7, a diagram illustrating an exemplary hierarchical structure of a software resource template parallel to the software resource to be created is depicted in accordance with an illustrative embodiment of the present invention. As depicted in FIG. 7, DB2 software module 700 includes a hierarchical DB2 installation software resource template 702 that includes two instances of software resource templates: DB2 instance 704 and DB2 instance 706.

When an auto installer examines the structure of DB2 installation 702, a structure parallel to the structure is realized into server X 708. In this example, DB2 installation software installable 710 corresponding to DB2 installation software resource template 702 is realized in server X 708. DB2 instance Gigi 712 corresponding to DB2 instance 704 is realized in server X 710 and DB2 instance Gigica 714 corresponding to DB2 instance 706 is realized in server X 710. The structure in server X 710 is unfilled until the user is presented with the structure during deployment of the software. At that time, the user may fill in the missing values to complete the installation. Thus, the limitation of post-installation adjustments required by response files is eliminated and that installation information that cannot be predefined may still be included at installation time.

In addition, derived parameters within each template are also realized as dependencies of software on different machines. As described in the first illustrative embodiment, the structure in server X 708 may be consumed by user define workflow implementations which take the templates and retrieve the best matched binaries to start configuration. Software with corresponding structure may then be created according to the template structure.

In another illustrative embodiment, the present invention provides a third mechanism that automatically manages desired state of a machine once the software is deployed. The third mechanism is capable of making two comparisons. The first comparison compares software resources that are installed and configured on a machine with a software specification that is captured using a server template. The second comparison compares the patch installed on a machine with approved or available patches that should have been applied to the machine at a given time. Thus, the first comparison is made against a predefine set of items, while the second comparison is made against patches that are available and approved at the time of the analysis.

A server template is a fixed target. The server template specifies software modules that are part of a default installation and it is used as reference. For the first comparison, the third mechanism of the present invention first analyzes software resources that are deployed on a machine and identifies modules from which the software resources are installed. The mechanism then compares the modules that should be installed as specified in the server template with ones that are actually installed to determine a delta. This delta, which represents the difference, is presented to the user for analysis.

Alternatively, the third mechanism of the present invention determines if a given machine is up to date with the most recent patch updates. The second comparison is made by first identifying patches that could be applied on the machine for all installed software and then by checking which patches are not already installed on the machine. This analysis takes into account all approved patches from the list of available patches. The available patches may be obtained from the software catalog. In this way, every time a new patch is defined and marked as approved, the mechanism determines if it needs to be applied to the machine automatically without the need for the administrators to examine individual machines.

In yet another illustrative embodiment, the third mechanism of the present invention performs its analysis using data that is stored in a data center model rather than data extracted from individual machines. The data center model comprises information about what software is installed in the data center devices. The use of the data center model instead of software on individual machines allows analysis to be performed uniformly for all types of systems without any proprietary technology. Thus, the third mechanism of the present invention provides a centralized patch compliance assessment and desired state management in a data center that comprises heterogeneous devices.

The patch application analysis may leverage the software model provided by the first mechanism of the present invention. For example, patches that are applicable to the software may be defined in the metadata of the software definition. If a new patch is defined in the software catalog, the software definition of the target machine may be dynamically recalculated to include the new patch.

Figure 8:
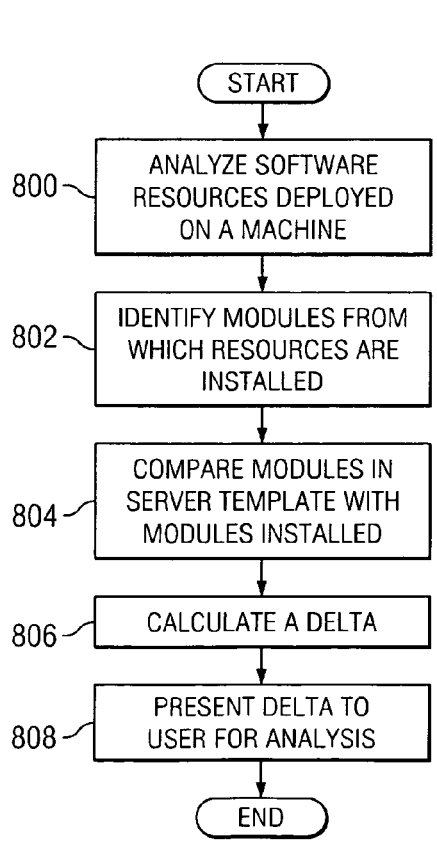
FIG. 8 is a flowchart of an exemplary process for leveraging server template to manage desired state in accordance with an illustrative embodiment of the present invention.

Turning now to FIG. 8, a flowchart of an exemplary process for leveraging a server template to manage a desired state is depicted in accordance with an illustrative embodiment of the present invention. As shown in FIG. 8, the process begins when the mechanism of an embodiment of the present invention analyzes software resources that are deployed on a machine (step 800). Next, the mechanism of an embodiment of the present invention identifies modules from which the software resources are installed (step 802).

The mechanism of an embodiment of the present invention then makes a comparison between modules that should have been installed as defined in the server template and modules that are actually installed on the machine (step 804). The mechanism then calculates a delta representing the difference of the comparison (step 806) and presents the delta to the user for analysis (step 808). Thus, the process terminates thereafter.

Figure 9:
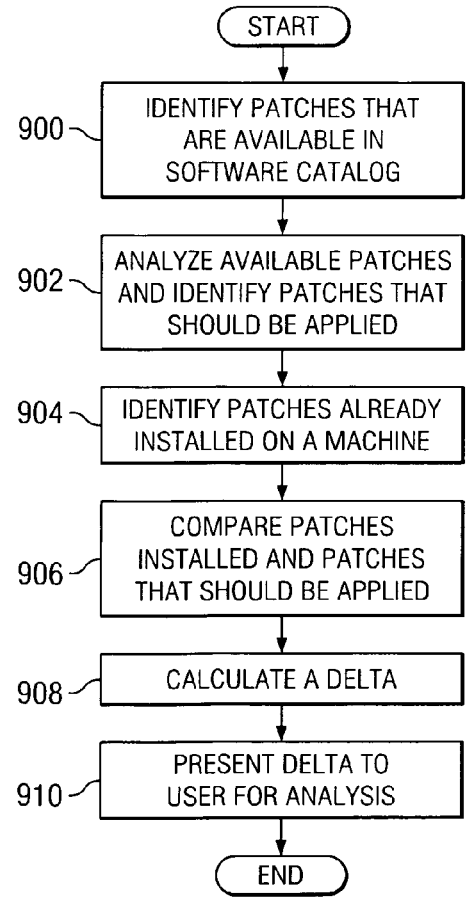
FIG. 9 is a flowchart of an exemplary process for using software resources in a data center model to assess patch compliance in accordance with an illustrative embodiment of the present invention.

Turning now to FIG. 9, a flowchart of an exemplary process for using software resources in a data center model to assess patch compliance is depicted in accordance with an illustrative embodiment of the present invention. As shown in FIG. 9, the process begins when the mechanism of an embodiment of the present invention identifies patches that are available and approved (step 900). The patches available are obtained from a software catalog, because whenever a new patch is defined, the new patch is marked in the software catalog for the mechanism to determine whether it needs to be applied to the machines.

The mechanism of an embodiment of the present invention analyzes the list of available and approved patches and identifies what patches should be applied to each piece of software installed on the target machine (step 902).

Next, the mechanism identifies patches that are already installed on the machine (step 904). This step may be performed by using data from the data center model. The mechanism then makes a comparison between patches that are available and should be applied to the target machine from step 902 and patches that are already installed in the machines from step 904 (step 906) and calculates a delta representing the difference of the comparison (step 908). Finally, the mechanism presents the delta to the user for analysis (step 910) with the process terminating thereafter.

In summary, embodiments of the present invention enhance manageability of the software catalog by providing a software model that separates metadata of software from its binaries. The embodiments of the present invention also provide a mechanism that abstracts software configuration for automation. Furthermore, the embodiments of the present invention provide a mechanism of desired state management and patch compliance assessment. With the software model of embodiments of the present invention, different specificity may be defined at different levels of the software, such that functional requirements are validated against the target machine for viability. In addition, best matched software installable may be identified by different installation mechanisms based on satisfaction of installation requirements. With the hierarchical software resource template of embodiments of the present invention, response files are no longer needed for specifying deployment options and configuration parameters.

In addition, dependencies between parameters, parameters that could not be previously pre-defined, and a more flexible structure may be provided at installation time. Furthermore, with the desired state management and patch compliance assessment mechanism, differences between installed modules or patches and desired modules or patches may be identified and presented to the user for analysis.

It is important to note that while the embodiments of the present invention have been described in the context of a fully functioning data processing system, those of ordinary skill in the art will appreciate that the processes of the embodiments of the present invention are capable of being distributed in the form of a computer usable medium of instructions and a variety of forms and that the embodiments of the present invention apply equally regardless of the particular type of signal bearing media actually used to carry out the distribution. Examples of computer usable media include recordable media such as a floppy disc, a hard disk drive, a RAM, and CD-ROMs and transmission media such as digital and analog communications links.

The description of the embodiments of the present invention have been presented for purposes of illustration and description, but are not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing software provisioning, the method comprising:

separating metadata of a definition of a software from executable binaries of the software using a software model, the software model including a software catalog, at least one software module representing the metadata, at least one software installable representing specific versions of the executable binaries, and at least one installation mechanism for installing the at least one software installable, wherein the metadata describes functions the software performs and what attributes are used to install the software;

validating installation requirements of the software against functional capabilities of a target system;

responsive to validating the installation requirements, traversing a set of software installables based on a priority;

responsive to traversing the set of software installables, identifying a best software installable from the set of software installables for installation of the software based on installation prerequisites of each software installable in the set of software installables;

responsive to identifying the best software installable, invoking the best software installable to install the software;

abstracting installation configuration parameters and settings of the software using at least one software resource template, wherein the at least one software resource template is hierarchical and comprises a derived and simple parameter, wherein values of the derived parameter compose of one or more tokens with at least one token derived from another parameter, and wherein the simple parameter holds its own value;

realizing the at least one software resource template structure to a target system structure, wherein the realizing comprises:

consuming the at least one software resource template using user defined workflows; and identifying a best software installable to configure the software according to the configuration and settings of the at least one software resource template;

creating instances of the software on the target system using the target system structure, the instances of the software including dependencies between software modules that correspond to dependencies between parameters of the at least one software resource template;

responsive to detecting a change to the at least one software resource template, creating a new software resource template capturing the change;

responsive to a software installation, comparing software resources deployed on a target system with software resources defined in a server template;

determining a difference between the software resources deployed and the software resources defined;

analyzing a list of approved and available patches in a software catalog, the list of approved and available patches being defined in a metadata of a software definition;

identifying candidate patches that should be applied to a target system from the list of approved and available patches;

comparing the candidate patches with patches installed on the target system;

determining a difference between the candidate patches and patches installed; and presenting the difference between the software resources deployed and the software resources defined and the difference between the candidate patches and patches installed to a user.

2. A method in a data processing system for managing software provisioning, the method comprising:

separating metadata of a definition of a software from executable binaries of the software using a software model;

validating installation requirements of the software against functional capabilities of a target system;

responsive to validating the installation requirements, traversing a set of software installables based on a priority;

responsive to traversing the set of software installables, identifying a best software installable from the set of software installables for installation of the software based on installation prerequisites of each software installable in the set of software installables; and responsive to identifying the best software installable, invoking the best software installable to install the software; abstracting installation configuration parameters and settings of the software using at least one software resource template, wherein the at least one software resource template is hierarchical;

realizing the at least one software resource template structure to a target system structure; and creating instances of the software on the target system using the target system structure.

3. The method of claim 2, wherein the software model includes a software catalog, at least one software module representing the metadata, at least one software installable representing specific versions of the executable binaries, and at least one installation mechanism for installing the at least one software installable, wherein the metadata describes functions the software performs and what attributes are used to install the software.

4. The method of claim 3, wherein the validating, traversing, and identifying steps are performed by the at least one installation mechanism.

5. The method of claim 3, wherein one of the at least one software module is installed by more than one installation mechanism, and wherein each installation mechanism of the at least one installation mechanism uses a different software installable with a priority.

6. The method of claim 2, wherein a degree of specificity defined for the metadata is different from a degree of specificity defined for the executable binaries.

7. The method of claim 2, wherein the at least one software resource template comprises a derived and simple parameter, wherein values of the derived parameter compose of one or more tokens with at least one token derived from another parameter, and wherein the simple parameter holds its own value.

8. The method of claim 7, wherein the another parameter is from one of a same software resource template and a different software resource template.

9. The method of claim 7, wherein the at least one software resource template comprises a set of parameters, wherein one parameter in the set of parameters depends on another parameter in the set of parameters, and wherein the another parameter is a module on a different data processing system.

10. The method of claim 2, wherein the realizing step comprises:

consuming the at least one software resource template using user defined workflows; and identifying a best software installable to configure the software according to the configuration and settings of the at least one software resource template.

11. The method of claim 2, wherein the instances of the software includes dependencies between software modules that correspond to dependencies between parameters of the at least one software resource template.

12. The method of claim 2, wherein the target server structure is unfilled until a user is presented with the target server structure during deployment of the software, and wherein the user fills in missing values of the target server structure to complete an installation of the software.

13. The method of claim 2, further comprising:

responsive to detecting a change to the at least one software resource template, creating a new software resource template capturing the change.

14. The method of claim 13, further comprising:

responsive to a software installation, analyzing a list of approved and available patches in a software catalog;

identifying candidate patches that should be applied to a target system from the list of approved and available patches;

comparing the candidate patches with patches installed on the target system;

determining a difference between the candidate patches and patches installed; and presenting the difference to a user.

15. The method of claim 13, wherein the server template specifies software modules that are part of a default installation.

16. The method of claim 2, further comprising:

responsive to a software installation, comparing software resources deployed on a target system with software resources defined in a server template;

determining a difference between the software resources deployed and the software resources defined; and presenting the difference to a user.

17. The method of claim 16, wherein the software resources deployed and the patches installed are determined based on a data center model of a data center.

18. The method of claim 17, wherein the list of approved and available patches is defined in a metadata of a software definition and wherein the software definition is recalculated if the new patches are approved.

19. The method of claim 16, wherein the list of approved and available patches are approved responsive to an administrator defining and marking each of the patches in the list as approved.

20. A data processing system comprising:

a bus;

a memory connected to the bus, wherein a set of instructions are located in the memory; and a processing unit connected to the bus, wherein the processing unit executes the set of instructions to separate metadata of a definition of a software from executable binaries of the software using a software model, wherein the metadata describes functions the software performs and what attributes are used to install the software; validate installation requirements of the software against capabilities of a target system; traverse a set of software installables based on a priority responsive to validating the installation requirements; identify a best software installable from the set of software installables for installation of the software based on installation prerequisites of each software installable in the set of software installables responsive to traversing the set of software installables; and invoke the best software installable to install the software responsive to identifying the best software installable.

21. A computer program product, comprising computer executable instructions recorded in a computer recordable medium, for enhancing software catalog manageability, providing abstract software configuration for automation, and desired state management, the computer program product comprising:

first instructions for separating metadata of a definition of a software from executable binaries of the software using a software model, wherein the metadata describes functions the software performs and what attributes are used to install the software;

second instructions, responsive to the first instructions, for validating installation requirements of the software against capabilities of a target system;

third instructions, responsive to the second instructions, for traversing a set of software installables based on a priority responsive to validating the installation requirements;

fourth instructions, responsive to the third instructions, for identifying a best software installable from the set of software installables for installation of the software based on installation prerequisites of each software installable in the set of software installables; and fifth instructions for invoking the best software installable to install the software responsive to identifying the best software installable.

* * * * *